United States Patent
Goldman et al.

(10) Patent No.: US 7,908,546 B2
(45) Date of Patent: Mar. 15, 2011

(54) METHODS AND APPARATUS FOR DETECTION OF PERFORMANCE CONDITIONS IN PROCESSING SYSTEM

(75) Inventors: Stuart Owen Goldman, Scottsdale, AZ (US); Richard E. Krock, Naperville, IL (US); Karl F. Rauscher, Emmaus, PA (US); James Philip Runyon, Wheaton, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 962 days.

(21) Appl. No.: 11/747,526

(22) Filed: May 11, 2007

(65) Prior Publication Data
US 2008/0282134 A1 Nov. 13, 2008

(51) Int. Cl.
*G06F 11/00* (2006.01)
(52) U.S. Cl. ............. 714/798; 714/47; 700/32; 370/241
(58) Field of Classification Search ................. 714/798, 714/47; 700/32; 370/241
See application file for complete search history.

(56) References Cited

U.S. PATENT DOCUMENTS

| | | | | |
|---|---|---|---|---|
| 6,101,419 A | * | 8/2000 | Kennedy et al. | 700/3 |
| 6,711,134 B1 | * | 3/2004 | Wichelman et al. | 370/241 |
| 7,020,701 B1 | * | 3/2006 | Gelvin et al. | 709/224 |
| 7,426,657 B2 | * | 9/2008 | Zorek et al. | 714/13 |

* cited by examiner

Primary Examiner — M. Mujtaba K Chaudry
Assistant Examiner — Enam Ahmed
(74) Attorney, Agent, or Firm — Ryan, Mason & Lewis, LLP

(57) ABSTRACT

Techniques are disclosed for detection of performance conditions in processing systems. For example, a method of detecting a performance condition in at least one particular processing device of a processing system having a plurality of processing devices includes the following steps. Data is input to a data structure associated with the particular processing device, over a given time period. The input data may be a buffer or a bucket. The input data represents data associated with the execution of at least one function performed by the particular processing device. The given time period includes the time period between consecutive heartbeat signals transmitted by the particular processing device. At least a portion of the input data is removed from the data structure associated with the particular processing device, near the end of the given time period. The removed input data is compared to an expected function execution level. An alarm signal is generated, when warranted, based on the comparison of the removed input data to the expected function execution level such that a performance condition in the particular processing device is determinable.

20 Claims, 4 Drawing Sheets

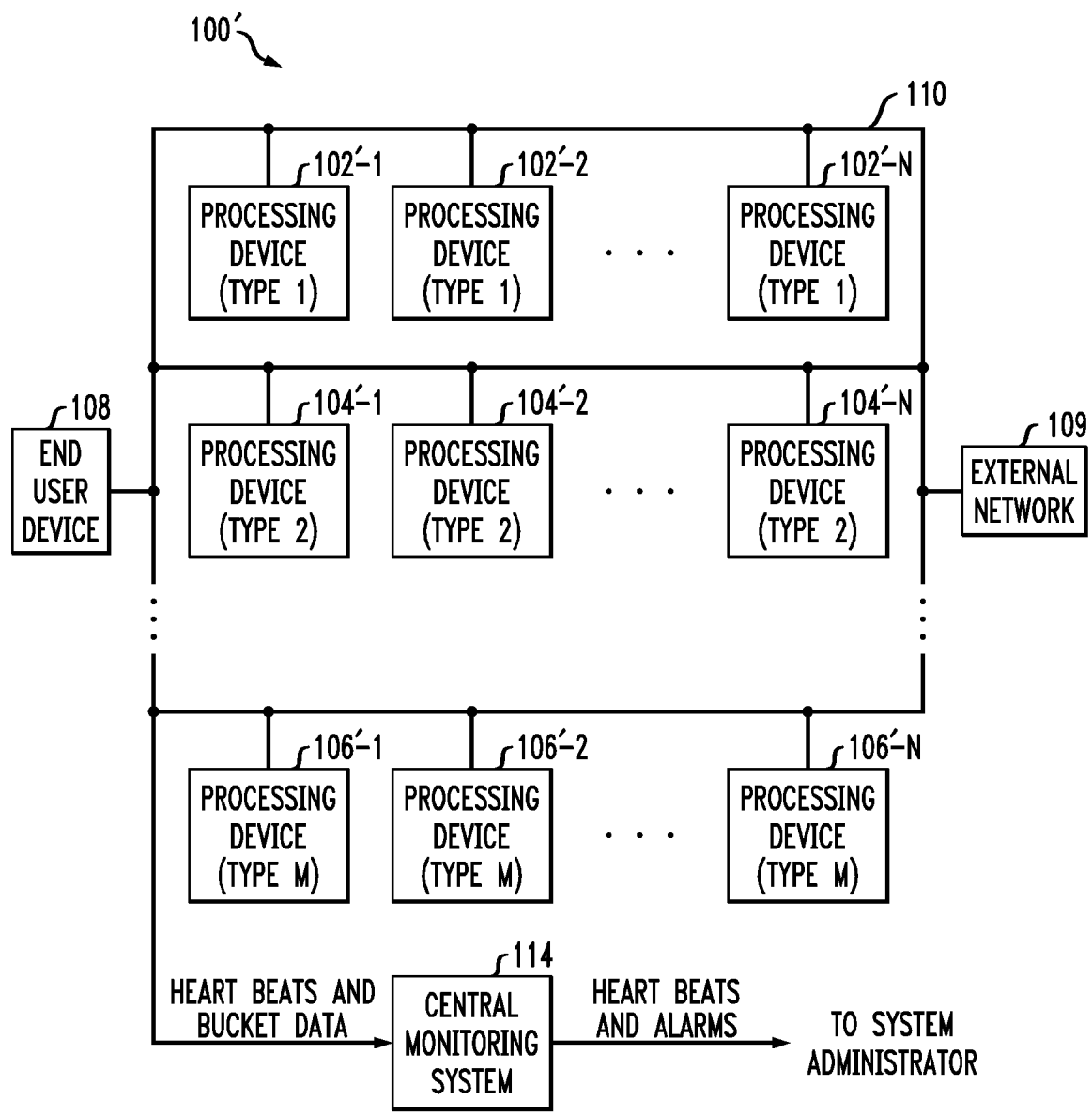

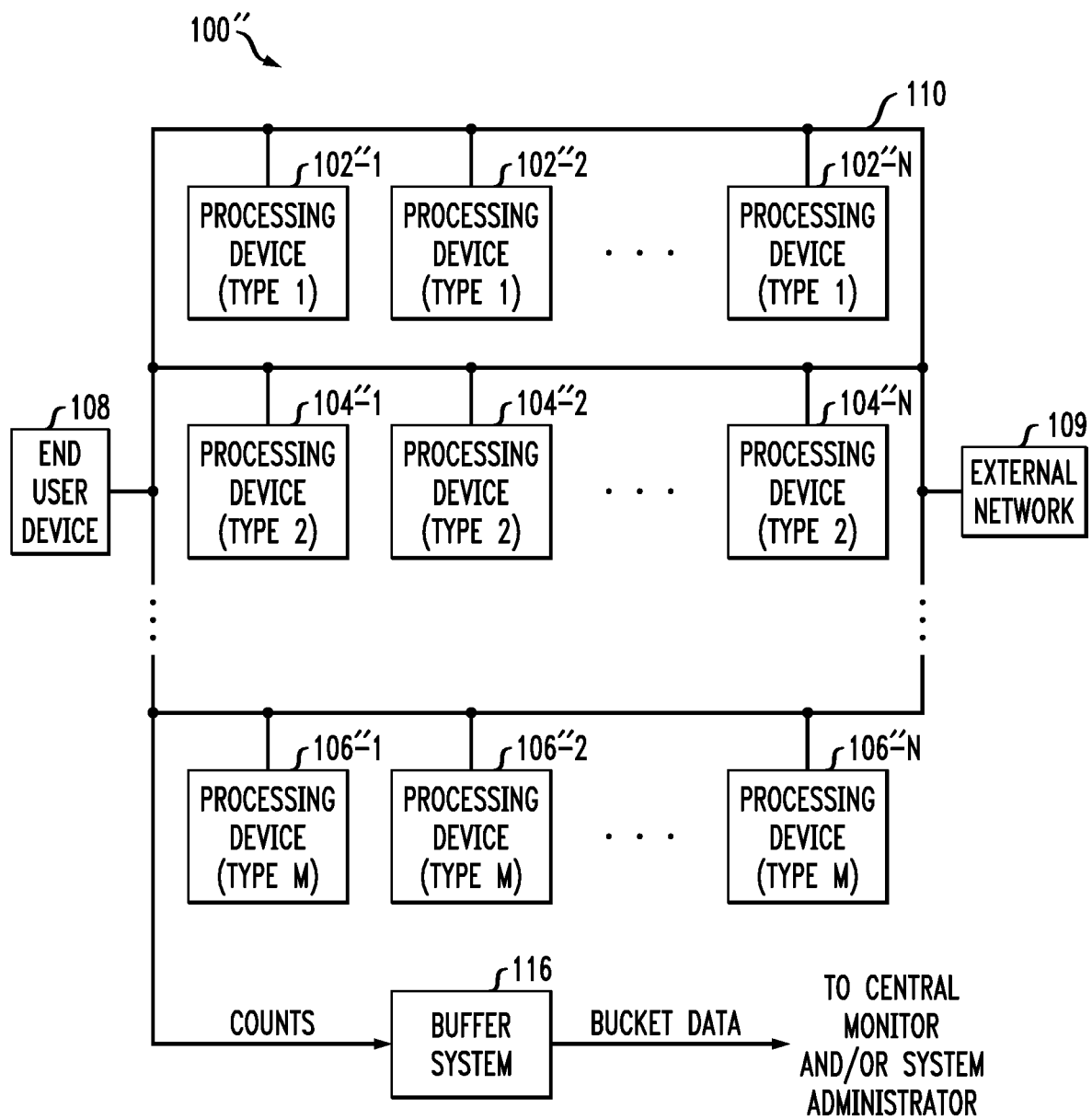

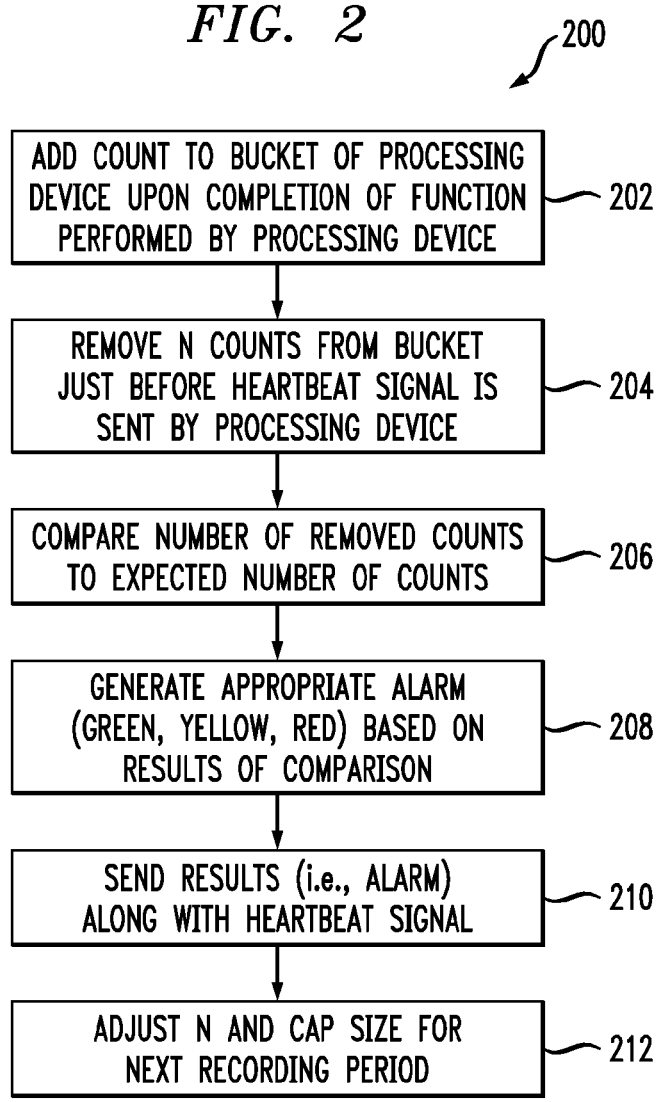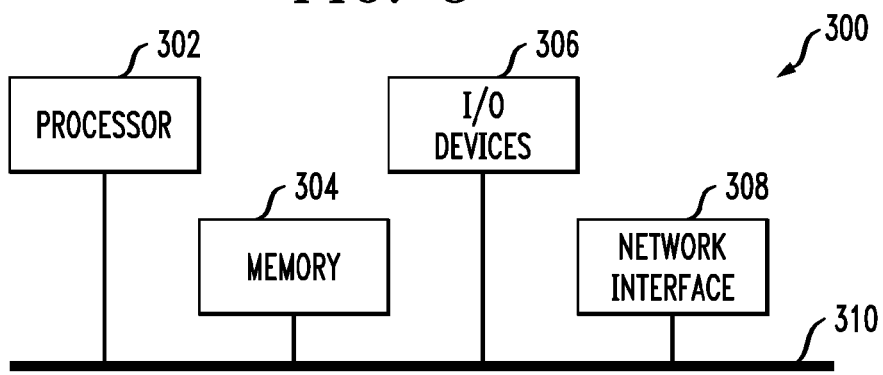

METHODS AND APPARATUS FOR DETECTION OF PERFORMANCE CONDITIONS IN PROCESSING SYSTEM

FIELD OF THE INVENTION

The present invention relates to processing systems such as communications systems and computing systems. More particularly, the present invention relates to techniques for detection of performance problems in such systems.

BACKGROUND OF THE INVENTION

It is known that in most processing systems, such as communications systems and computing systems, next generation products typically tend to be more complex as compared with products developed from predecessor technologies. Furthermore, in any such system, there are typically a number of dissimilar processes running on a multitude of dissimilar platforms. When the system works, the results can be impressive. However, when there are capacity issues or failures that can not be attributed to a particular processing device in the system, it is increasingly difficult to quickly determine when a portion of the system starts to fail to correctly handle traffic, especially when traffic is being distributed across a number of dissimilar processing devices.

As an example, assume a processing system composed of collections of different types of processing devices. Further, assume that the system has 20 processing devices of type A performing a critical function for the completion of traffic. Further assume one of the processing devices is continuing to send a heartbeat signal to a monitor (e.g., system administrator console or central monitoring device) of the system, but the processing device is not correctly handling all of the traffic that the processing device is expected to handle. Still further, assume that the other 19 processing devices are performing correctly.

As is known, sending of a heartbeat signal indicates to the receiver that the sender is still "alive" (operating in at least some capacity—e.g., able to handle at least some traffic), as opposed to the failure of the sender to send a heartbeat signal which indicates to the expectant receiver that the sender is no longer "alive" (failing to operate in at least some capacity—e.g., not able to handle any traffic).

In the above case, a system administrator observing the system would see a system handling at least 95% of the offered traffic and may not easily detect either the loss of the 5% or that this loss can be attributed to one processing device that is not performing well. Even a short period of time in this condition can adversely affect the ability of the processing system to be considered a highly reliable system. Reliability of a processing system is one of the critical criteria that service providers agree to with customers in service level agreements.

The schemes used by existing processing systems measure and report on traffic periodically, for example, on 15 minute periods. By examining the records from a few periods, manually or by automatic means, a system administrator is often able to detect a problem, but only after the passage of a significant amount of time and only if the system administrator is looking carefully at the data. While heartbeat signals tell the system administrator when a processing device ceases to function, what is missing is the ability to, in near real time, detect a processing device that is still alive but is not correctly handling traffic.

SUMMARY OF THE INVENTION

Principles of the present invention provide techniques for detection of performance conditions in processing systems.

For example, in one aspect of the invention, a method of detecting a performance condition in at least one particular processing device of a processing system having a plurality of processing devices includes the following steps. Data is input to a data structure associated with the particular processing device, over a given time period. The input data may be a buffer or a bucket. The input data represents data associated with the execution of at least one function performed by the particular processing device. The given time period includes the time period between consecutive heartbeat signals transmitted by the particular processing device. At least a portion of the input data is removed from the data structure associated with the particular processing device, near the end of the given time period. The removed input data is compared to an expected function execution level. An alarm signal is generated, when warranted, based on the comparison of the removed input data to the expected function execution level such that a performance condition in the particular processing device is determinable.

In one embodiment, the input data may represent a count of the number of times the particular processing device completes execution of the function associated with the bucket. The portion of input data removed from the data structure, for the given time period, may be determined as a percentage of the number of counts input to the data structure for the given time period. The amount of input data removed from the data structure may be adjustable for a subsequent time period. Adjustment of the amount of input data removed from the data structure for the subsequent time period may be a function of a previous time period. The amount of input data removed from the data structure may have a minimum value greater than zero.

In one embodiment, the generated alarm signal may be representative of an initial warning indicative of an initial detection of a potential performance problem in the particular processing device. The occurrence of multiple initial warnings over multiple given time periods may result in generation of at least a second alarm signal that is representative of a warning of higher priority than the initial warning.

Further, the data structure may be maintained internal to the particular processing device, or it may be maintained external to the particular processing device. The size of the data structure may be adjustable for a subsequent time period.

The method may further include the step of transmitting the alarm signal along with the heartbeat signal to a system administrator and/or a central monitoring system.

Still further, it is to be understood that each of the plurality of processing devices in the processing system may have respective data structures associated therewith such that the inputting, removing, comparing, and generating steps are performable for each of the plurality of processing devices.

The processing system may be at least a part of a communications system or a computing system.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 1C illustrates a processing system according to another embodiment of the present invention.

FIG. 1D illustrates a processing system according to a yet another embodiment of the present invention.

FIG. 2 illustrates a method of detecting performance problems in a processing device of a processing system according to one embodiment of the present invention.

FIG. 3 illustrates a computing architecture according to one embodiment of the present invention.

DETAILED DESCRIPTION OF PREFERRED EMBODIMENTS

While principles of the present invention are generally applicable to any processing system, including but not limited to communications systems and computing systems, such principles are particularly well suited for use in a distributed processing system such as a Universal Mobile Telecommunications System (UMTS) mobile switching office.

Figure 1A:
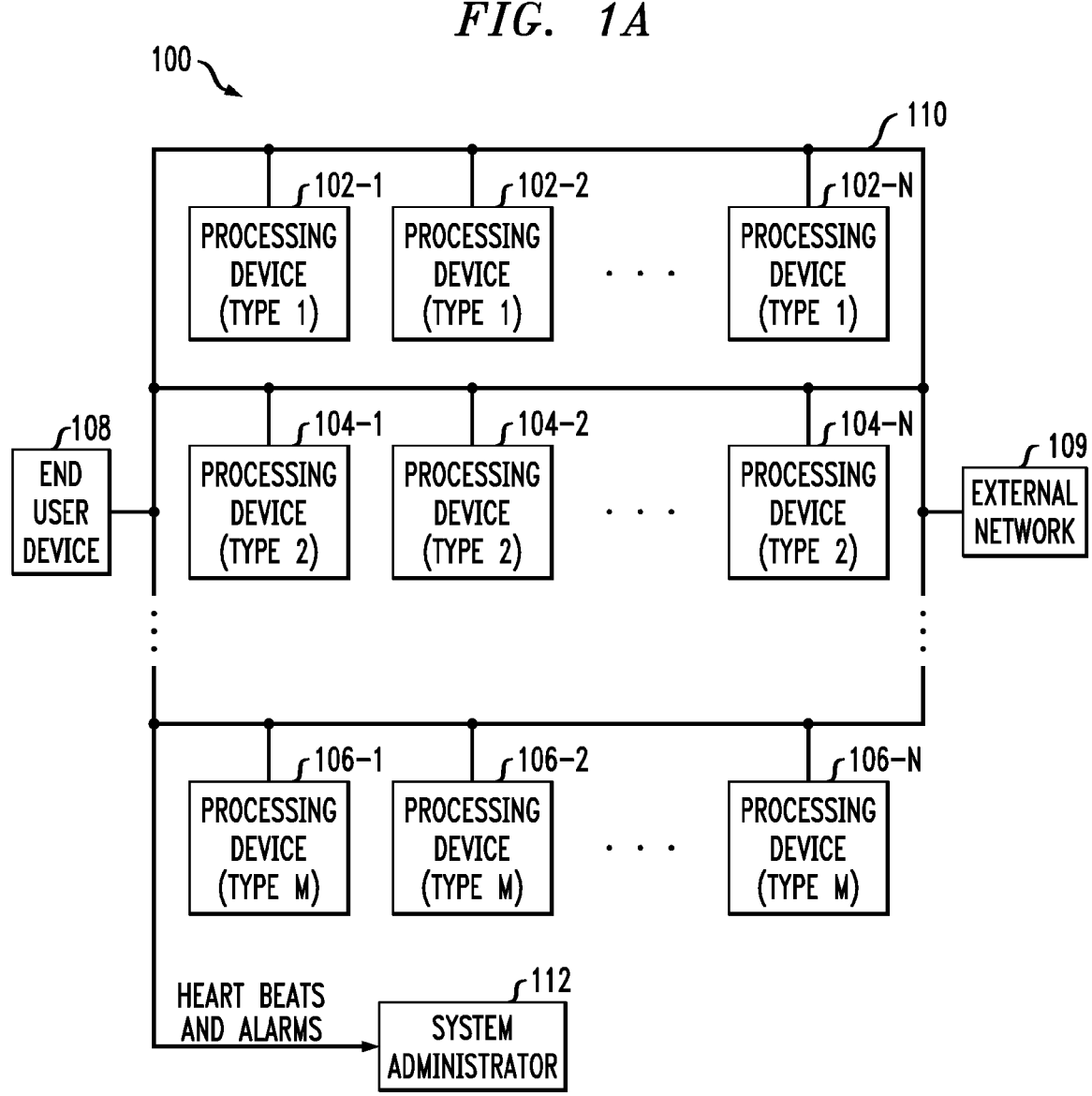
FIG. 1A illustrates a processing system according to one embodiment of the present invention.

Referring initially to FIG. 1A, a processing system according to one embodiment of the present invention is shown. Processing system 100 includes a plurality of processing devices, depicted as 102-1, 102-2 . . . 102-N; 104-1, 104-2 . . . 104-N; and 106-1, 106-2 . . . 106-N, where N is a positive integer greater than two. As shown, processing devices 102-1, 102-2 . . . 102-N are of a first type in that they perform a first function in the processing system. Processing devices 104-1, 104-2 . . . 104-N are of a second type in that they perform a second function in the processing system. Processing devices 106-1, 106-2 . . . 162-N are of an M-th type in that they perform an M-th function in the processing system, where M is a positive integer greater than two. It is to be appreciated that the multiple processing devices executing multiple functions represent the fact that in such a processing system, dissimilar processes (functions 1, 2 . . . M) are executing on a multitude of dissimilar platforms (processing devices 102, 104 . . . 106). As an example, the first set of processing devices may be radio controllers while the second set of processing devices may be voice call control boxes, and a third set of processing devices may address control of data sessions. Other processing devices could address the health of the overall system and other specialized system level applications.

As further shown, end user device 108 is able to communicate with external network 109 via one or more of the plurality of processing devices in processing system 100. In a communications system implementation, end user device 108 may be a communication device of a subscriber and external network 109 may be a public switched telephone network (PSTN). In a computing system implementation, blocks 108 and 109 may represent two user devices seeking to access specific computational capabilities provided by one or more of the plurality of processing devices in processing system 100.

Further illustrated in processing system 100 of FIG. 1A is connection bus 110. It is understood that connection bus 110 generally represents the communication links that interconnect each of the plurality of processing devices with one another and each of end user device 108 and external network 109 to each of the plurality of processing devices. By way of example only, connection bus 110 may represent a local area network, a wide area network, a wireless network, a wired network, or any other network that is suitable for providing communication between all of the components of the processing system.

It is to be understood that in FIG. 1A, the number of processing devices shown in processing system 100 and the number of devices accessing the processing system are for illustration purposes only and that more or less processing devices and access devices may be employed.

Still further, FIG. 1A illustrates system administrator console 112 coupled to each of the plurality of processing devices in processing system 100 via connection bus 110. The system administrator console receives heartbeat signals from each of the processing devices. As is well known, such heartbeat signals are messages periodically generated by a processing device that indicate to the system administrator that the processing device is functioning in some capacity. However, as pointed out above, a heartbeat signal alone does not typically give the system administrator any information concerning how well or how poorly the processing device is performing. This is one disadvantage that principles of the invention overcome using a "leaky bucket" approach, as will now be explained.

Figure 1B:
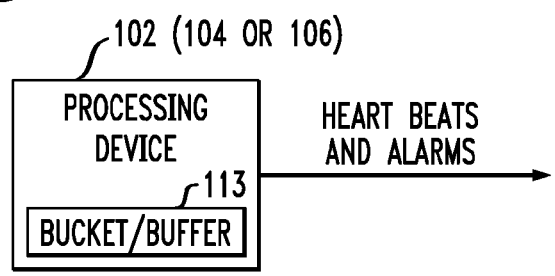
FIG. 1B illustrates a processing device according to one embodiment of the present invention.

In accordance with the embodiment depicted in FIG. 1A, principles of the invention provide for each processing device (102, 104, 106) to include a data structure in the form of a buffer or "bucket" (i.e., the so-called "leaky bucket"). This is shown in FIG. 1B. In general, data is stored in the bucket of a processing device each time the processing device completes the function (or transaction) it is configured to perform. For instance, in a communications system, if the processing device is configured to process a call, then each time a call is handled by the processing device, a data item representative of the completion of the processing of the call (i.e., a count) is added to the bucket. It is evident that such counts represent a measure of the traffic handled by the processing device, i.e., a transaction completion level. In other embodiments, the data item could represent some other piece of information.

The processing device removes N counts from the bucket just before it sends its heartbeat signal. The value of N is an adjustable percentage of the number of counts associated with a given time period. In one embodiment, the given time period may be the time period between previous heartbeat signals (referred to as the previous recording period). The number of counts removed is compared to an expected number of counts, and depending on the results of the comparison, various types of alarms can be generated by the processing device and sent to the system administrator console, along with the heartbeat messages. An alarm might be indicative of the fact that the call completion rate of the processing device that generated the alarm has fallen below some expected level, thus warranting review by the system administrator and possibly the taking of some corrective action.

Advantageously, corrective action can be taken within seconds using the leaky bucket approach of the invention, rather than waiting for tens of minutes using the existing approach wherein the system administrator examines records every 15-30 minutes or more.

Before turning to a description of an illustrative process that is performed in correspondence with the processing system implemented in FIG. 1A, i.e., wherein each processing device maintains a bucket and generates alarms that are sent to the system administrator, some alternate implementations are described.

FIG. 1C illustrates processing system 100' with similar processing devices (102', 104', 106') as shown in FIG. 1A, but which differs in the following manner. While data is stored in the bucket of a processing device as the processing device completes the function (or transaction) it is configured to perform, the processing device itself does not perform any comparison or alarm generation operations. Rather, each processing device sends its collected bucket data to central monitoring system 114, along with heartbeat signals. Monitoring system 114 then itself performs the comparison and alarm generation operations from the bucket data it receives from each processing device. The generated alarms can then be sent to the system administrator for review and/or corrective action to be taken.

FIG. 1D illustrates processing system 100" with similar processing devices (102", 104", 106") as shown in FIG. 1A, but which differs in the following manner. Rather than each processing device maintaining its own bucket, the system shows a buffer system 116 separate from each processing device. In this way, the buffer system maintains a separate bucket for each processing device. Such collected bucket data can then be passed on to the central monitor for comparison and alarm generation. The data could also be passed on to the system administrator console wherein similar processing could occur.

It is to be appreciated that while the illustrative implementations described above have depicted all of the processing devices in the processing system providing count data to buckets, it is to be understood that the system may be configured for less than all of the processing devices to be configured in this manner. Further, one skilled in the art will realize other alternate implementations that are straightforward variations of the illustrative implementations described above.

Referring now to FIG. 2, a method is shown for detecting performance problems in a processing device of a processing system according to one embodiment of the present invention. That is, flow diagram 200 of FIG. 2 illustrates a process that is performed in correspondence with the processing system implemented in FIG. 1A, i.e., wherein each processing device maintains a bucket and generates alarms that are sent to the system administrator console. Thus, flow diagram 200 depicts the steps of the process from the perspective of each processing device. However, it is to be appreciated that the steps described in the context of FIG. 2 are readily alterable so as to operate in accordance with the alternate processing system implementations shown in FIGS. 1C and 1D, as well as any other appropriate implementation variations. Further, less than all of the processing devices in the processing system can implement the bucket technique of the invention.

As shown in step 202, count data is added to the bucket associated with the processing device each time the function of the processing device has been completed. In step 204, the processing device removes N counts just before the heartbeat message is sent (removal of data from the bucket is considered the "leak" in the leaky bucket approach of the invention). Assuming that a heartbeat signal is sent out by the processing device every second, the processing device would remove the N counts as close to the heartbeat transmission time as is operationally possible for the given processing device. By way of example only, this can be on the order of a few microseconds before the heartbeat transmission.

As mentioned above, N is determined mathematically based on the measure of traffic for the last recording period, that is, the time period between the previous two heartbeat signals. In the example below, assume that N is set at 85% of the last period's traffic per processing device. However, it is to be understood that any suitable algorithm can be utilized to compute N. In a preferred embodiment, the processing system dynamically changes N such that N tracks the expected traffic based on the last period, as a starting point.

In step 206, the number of removed counts (N counts) is compared to a number of counts that the processing device is expected to handle for the subject time period.

Thus, in accordance with one embodiment, if the completion level remains about a value slightly lower than the completion level of the last recording period, the bucket remains positive and the processing device does not need to generate a warning, or in a preferred embodiment, the processing device may generate a green alarm signal. If, however, the instantaneous completion level drops below the mathematically adjusted prior recording period expectation, the bucket will go negative and an alarm can be generated by the processing device. Successive negative conditions being detected can change the alarm from green to yellow to red in a very short period of time (seconds rather than tens of minutes).

As shown, the appropriate alarm is generated in step 208, this alarm can be a warning to the system administrator to further explore the condition of the processing device to determine its health verses a drop off of incoming traffic for other reasons. Such a drop off may be related to a problem external to this processing device (e.g., overall loss of data input line to the processing system), but still needs to be addressed by the system administrator.

As a simple example, let us assume that in the last 15 minute period the processing device completed 150,000 call related transactions. Thus, 85% of 150,000 equals 127,500. Let us further assume a one second heartbeat. Thus a sampling size would be the number of calls in 15 minutes divided by 900 (one second heart beat×15 minutes×60 seconds/minute). So in this case, a value of about 140 for N might be practical. If traffic tends to not be smooth, a somewhat smaller number of N, such as 100, might be selected. Thus, the system administrator would get the first yellow warning (alarm) in about two seconds. Assuming that 10 consecutive yellow warnings are required before going to a red warning, the system administrator would get a red warning in 12 seconds, rather that the 15-30 minutes using existing problem detection schemes.

In step 210, the generated alarm (results) and heartbeat signal are sent to the system administrator console.

In step 212, as mentioned above, N is adjusted for use in the next recording period, i.e., the next period within which counts are removed from the bucket, compared and results reported (in the form of a warning or alarm) along with the heartbeat signal.

In order to prevent the bucket from having too much latency time because of excess counts previously stored in the bucket but not removed, there is a finite cap set on the size of the bucket of X times N, and the cap is recalculated when N is recalculated at the end of each recording period (also in step 212). Further, there is a hard cap size on the bucket to prevent the calculated value from actually exceeding the logical size of the bucket desired. This "max cap" value for each processing device is administrable by the system administrator.

In order to prevent an ineffectual warning scheme after a period when there was a transaction failure or the processing device had been re-initialized, rather than allowing N to go to zero, there is a minimum value for N that is maintained for each processing device. This value for each processing device is administrable by the system administrator based on experience with the transaction nominal traffic during the slowest periods.

It is to be appreciated that while the above implementations have illustratively referred to a single function being performed by a processing device and thus a single bucket being associated with the single function, principles of the invention are intended to extend to implementations wherein a processing device performs multiple functions and thus has multiple buckets respectively associated with the multiple functions.

Referring lastly to FIG. 3, a computing architecture is shown according to an embodiment of the invention. More particularly, it is to be appreciated that computing architecture 300 in FIG. 3 may be used to implement any of the components/steps described above in the context of FIGS. 1A through 2. That is, the computing architecture shown in FIG. 3 may be used to implement each of the processing devices and/or any end user devices. It may also be used to implement the system administrator console (FIG. 1A), the central monitoring system (FIG. 1C), and/or the buffer system (FIG. 1D). However, it is to be understood that principles of the invention are not limited to any particular computing system implementation.

In this illustrative implementation, a processor 302 for implementing at least a portion of the methodologies of the invention is operatively coupled to a memory 304, input/output (I/O) device(s) 306 and a network interface 308 via a bus 310, or an alternative connection arrangement.

It is to be appreciated that the term "processor" as used herein is intended to include any processing units, such as, for example, one that includes a central processing unit (CPU) and/or other processing circuitry (e.g., digital signal processor (DSP), microprocessor, etc.). Additionally, it is to be understood that the term "processor" may refer to more than one processing unit, and that various elements associated with a processing unit may be shared by other processing units.

The term "memory" as used herein is intended to include memory and other computer-readable media associated with a processor or CPU, such as, for example, random access memory (RAM), read only memory (ROM), fixed storage media (e.g., hard drive), removable storage media (e.g., diskette), flash memory, etc.

In addition, the phrase "I/O devices" as used herein is intended to include one or more input devices (e.g., keyboard, mouse, etc.) for inputting data to the processing unit, as well as one or more output devices (e.g., CRT display, etc.) for providing results associated with the processing unit. It is to be appreciated that such input devices may be one mechanism to provide inputs used by a system of the invention. Alternatively, the inputs could be read into the system from a diskette or from some other source (e.g., another computer system) connected to the computer bus 310. Also, inputs to the methodologies may be obtained in accordance with the one or more input devices. The output devices may be one mechanism for a user or other computer system to be presented with results of the methodologies of the invention.

Still further, the phrase "network interface" as used herein is intended to include, for example, one or more devices capable of allowing system 300 to communicate with other computing systems. Thus, the network interface may comprise a transceiver configured to communicate with a transceiver of another computer system via a suitable communications protocol. It is to be understood that the invention is not limited to any particular communications protocol.

It is to be appreciated that while principles of the invention have been described herein in the context of networks, the methodologies of the present invention may be capable of being distributed in the form of computer readable storage media, and that principles of the invention may be implemented, and its advantages realized, regardless of the particular type of media actually used for distribution. The term "computer readable storage media" as used herein is intended to include recordable-type media, such as, for example, a floppy disk, a hard disk drive, RAM, compact disk (CD) ROM, etc.

Accordingly, one or more computer programs, or software components thereof, including instructions or program code for performing the methodologies of the invention, as described herein, may be stored in one or more of the associated storage media (e.g., ROM, fixed or removable storage) and, when ready to be utilized, loaded in whole or in part (e.g., into RAM) and executed by processor 302.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of detecting a performance condition in at least one particular processing device of a processing system, wherein the processing system comprises a plurality of processing devices, the method comprising the steps of:
   inputting data to a data structure associated with the particular processing device, over a given time period, the input data representing data associated with the execution of at least one function performed by the particular processing device, and the given time period comprising the time period between consecutive heartbeat signals transmitted by the particular processing device;
   removing at least a portion of the input data from the data structure associated with the particular processing device, near the end of the given time period;
   comparing the removed input data to an expected function execution level; and
   generating an alarm signal, when warranted, based on the comparison of the removed input data to the expected function execution level such that a performance condition in the particular processing device is determinable.

2. The method of claim 1, wherein the input data represents a count of the number of times the particular processing device completes execution of the function.

3. The method of claim 2, wherein the portion of input data removed from the data structure, for the given time period, is determined as a percentage of the number of counts input to the data structure for the given time period.

4. The method of claim 1, wherein the amount of input data removed from the data structure is adjustable for a subsequent time period.

5. The method of claim 4, wherein adjustment of the amount of input data removed from the data structure for the subsequent time period is a function of a previous time period.

6. The method of claim 1, wherein the amount of input data removed from the data structure comprises a minimum value greater than zero.

7. The method of claim 1, wherein the generated alarm signal is representative of an initial warning indicative of an initial detection of a potential performance problem in the particular processing device.

8. The method of claim 7, wherein the occurrence of multiple initial warnings over multiple given time periods results in generation of at least a second alarm signal that is representative of a warning of higher priority than the initial warning.

9. The method of claim 1, wherein the data structure is maintained internal to the particular processing device.

10. The method of claim 1, wherein the data structure is maintained external to the particular processing device.

11. The method of claim 1, further comprising the step of transmitting the alarm signal along with the heartbeat signal to at least one of a system administrator and a central monitoring system.

12. The method of claim 1, wherein a size of the data structure is adjustable for a subsequent time period.

13. The method of claim 1, wherein each of the plurality of processing devices in the processing system have respective data structures associated therewith such that the inputting, removing, comparing, and generating steps are performable for each of the plurality of processing devices.

14. The method of claim 1, wherein the processing system is at least part of a communications system or a computing system.

15. Apparatus for detecting a performance condition in at least one particular processing device of a processing system, wherein the processing system comprises a plurality of processing devices, the apparatus comprising:

a memory; and at least one processor coupled to the memory and operative to: (i) input data to a data structure associated with the particular processing device, over a given time period, the input data representing data associated with the execution of at least one function performed by the particular processing device, and the given time period comprising the time period between consecutive heartbeat signals transmitted by the particular processing device; (ii) remove at least a portion of the input data from the data structure associated with the particular processing device, near the end of the given time period; (iii) compare the removed input data to an expected function execution level; and (iv) generate an alarm signal, when warranted, based on the comparison of the removed input data to the expected function execution level such that a performance condition in the particular processing device is determinable.

16. The apparatus of claim 15, wherein the input data represents a count of the number of times the particular processing device completes execution of the function.

17. The apparatus of claim 15, wherein the amount of input data removed from the data structure is adjustable for a subsequent time period.

18. The apparatus of claim 15, wherein the at least one processor is further operative to transmit the alarm signal along with the heartbeat signal to at least one of a system administrator and a central monitoring system.

19. The apparatus of claim 15, wherein a size of the data structure is adjustable for a subsequent time period.

20. A processing system, comprising:

a plurality of processing devices;

wherein a performance condition in at least one particular processing device of the plurality of processing devices is detectable by at least one processor configured to: (i) input data to a data structure associated with the particular processing device, over a given time period, the input data representing data associated with the execution of at least one function performed by the particular processing device, and the given time period comprising the time period between consecutive heartbeat signals transmitted by the particular processing device; (ii) remove at least a portion of the input data from the data structure associated with the particular processing device, near the end of the given time period; (iii) compare the removed input data to an expected function execution level; and (iv) generate an alarm signal, when warranted, based on the comparison of the removed input data to the expected function execution level such that a performance condition in the particular processing device is determinable.

* * * * *